July 24, 1923.
O. I. STRAUB ET AL
1,463,101
VAPOR BURNER
Filed May 1, 1922
2 Sheets-Sheet 2
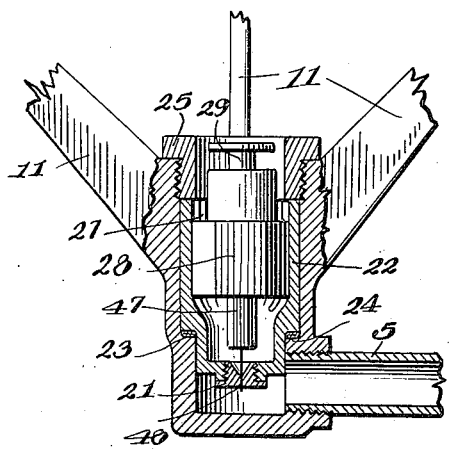
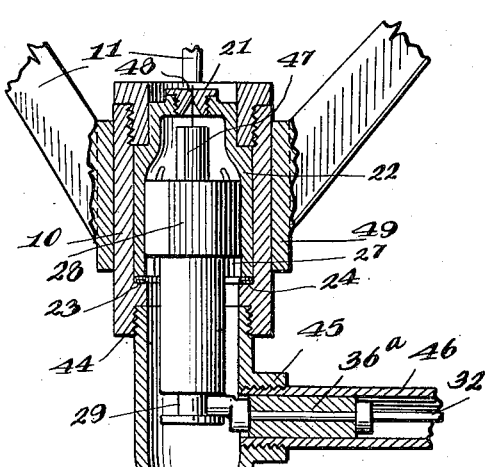
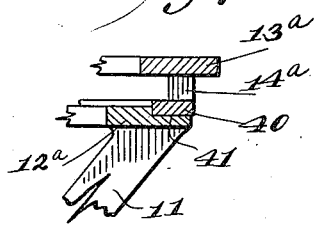
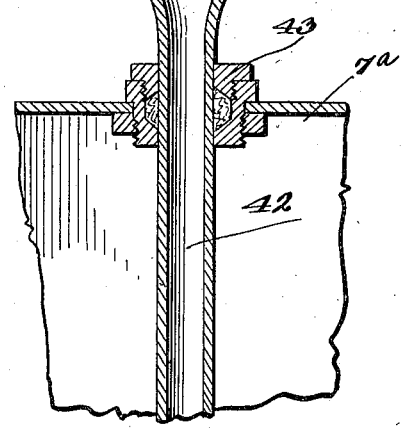
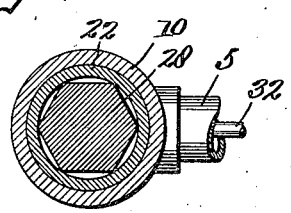
Inventors
O. I. Straub and
F. G. Wahl
By Wilkinson & Giusta
Attorneys Patented July 24, 1923.

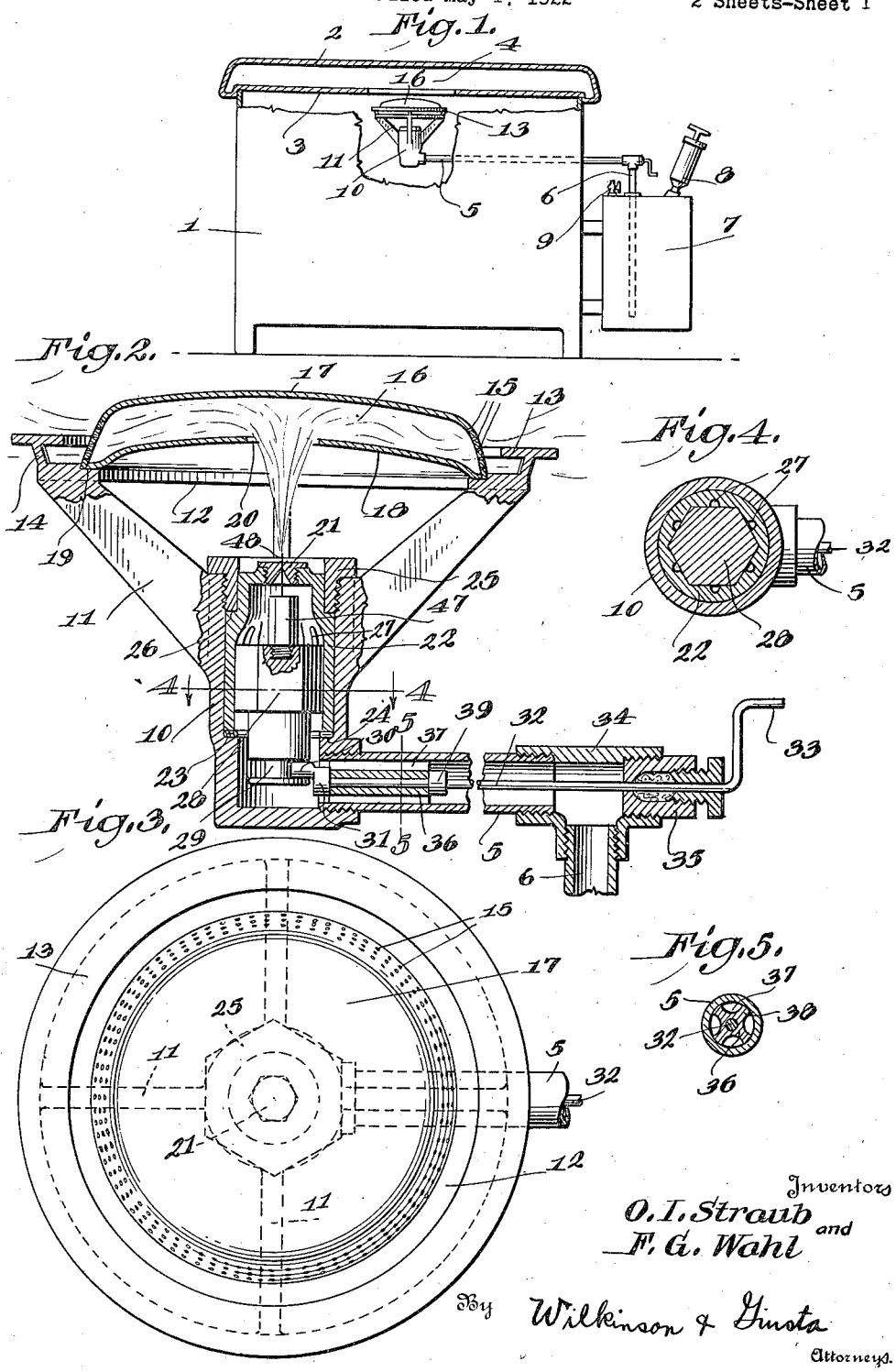

1,463,101

UNITED STATES PATENT OFFICE.

OSCAR I. STRAUB, OF BUFFALO, NEW YORK, AND FREDERICK G. WAHL, OF DETROIT, MICHIGAN; SAID WAHL ASSIGNOR TO SAID STRAUB.

VAPOR BURNER.

Application filed May 1, 1922. Serial No. 557,522.

*To all whom it may concern:*

Be it known that we, OSCAR I. STRAUB and FREDERICK G. WAHL, citizens of the United States, residing, respectively, at Buffalo and Detroit, in the counties of Erie and Wayne and States of New York and Michigan, have invented certain new and useful Improvements in Vapor Burners; and we do hereby declare the following to be a full, clear, and exact description of the invention, such as will enable others skilled in the art to which it appertains to make and use the same.

The present invention relates to improvements in vapor burners and has for an object to provide an improved burner constructed of few and simple parts that will lend itself to economical manufacture and to accessibility for purposes of cleaning, in which a more thorough distillation of the fuel oil will be had and a more perfect resulting combustion at the burner.

The present invention aims to correct and overcome difficulties, obstacles and inconveniences experienced with vapor burners as heretofore constructed, particularly in the matter of securing a more perfect combustion, avoiding unpleasant odors and loss of heat which occurs because of seepage of the fuel oil through the retort.

Other objects of the invention are to provide ease in the cleaning of the burner orifice and the rendering of this orifice adjustable, to render the manipulating means for the cleaner valve at all times cool and at a point remote from the burner, and to permit of the inverting of the parts to secure a thorough cleaning of the interior of the retort and its cooperating parts.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a side elevation of a stove with parts broken away showing an application of the improved vapor burner when in place therein;

Fig. 2 is a vertical sectional view of the burner;

Fig. 3 is a top plan view of the same;

Fig. 4 is a horizontal section taken on the line 4—4 in Fig. 2;

Fig. 5 is a vertical section taken on the line 5—5 also in Fig. 2;

Fig. 6 is a fragmentary view of the burner retort with the parts inverted for cleaning;

Fig. 7 is a fragmentary perspective view showing the heating ring arrangement;

Fig. 8 is a similar view showing a slight modification;

Fig. 9 shows a vertical section of a modified pipe arrangement for the fuel oil; and, Fig. 10 is a view similar to Fig. 4 showing a slight modification.

Referring more particularly to the drawings, 1 in general designates a stove whose top is composed of top and bottom plates 2 and 3 respectively being spaced apart to provide a heat receiving and diffusing chamber 4 therebetween with outlets at the corners whereby a single burner, centrally located, as indicated in Fig. 1, may suffice to heat the entire top plate 2 of the stove and as many receptacles, usually 4, as the stove accommodates. The lower plate 3 is provided with a central opening up through which the flame from the burner is intended to issue. The burner receives its supply of oil through pipes 5 and 6 from a tank or reservoir 7 held at the side of the stove or adjacent thereto. The oil tank is put under a suitable pressure as by a hand air pump 8 and the fuel is driven out into the lower open end of the pipe 6 which extends down near the base of the tank. A relief valve 9 is also placed upon the tank for the purpose of removing the pressure by allowing the air to escape when the burner is to be extinguished, or for reducing the pressure to lower the size of flame. Fig. 1 simply illustrates one of the useful applications of the improved burner; the scope of the invention is not intended to include the stove. The fuel tank may be at the side, rear or bottom of the stove.

The improved burner, as more particularly shown in Figs. 2 and 3, comprises a retort 10 which is generally cylindrical although it may be made in other desired cross sections, and from this retort a number of spider arms 11 diverge upwardly, carrying at their outer ends a base ring 12 for the support of a top heating ring 13 which is carried thereon attached, or in separate piece, as by an appropriate number of pellets 14 of a suitable metal. These pellets are of a desired height to secure a spacing of the heating ring 13 above the base ring 12 to allow of the flame issuing through the burner perforations 15 to get beneath and entirely around the heating ring 13.

The perforations 15 are provided about the marginal edge of a mixing chamber 16, provided between the spaced top and bottom plates 17 and 18. These plates are separate, or are suitably joined together at their edges, the upper edge being suitably dished or cupped as indicated and a shoulder or depressed shelf 19 is provided about the inner side of the base ring or upon the spider arms 11 to receive the lower edge of these plates.

The lower plate 18 contains a central opening 20 of a suitable diameter to receive the commingled air and vaporized fuel oil; the latter issues upwardly through a perforated cap 21 in the top of the retort. This cap 21 is preferably screw threaded into the upper closed end of a liner cylinder 22 that fits within the retort 10 and has an open bottom resting upon a compressible gasket 23 that lies upon a shelf 24 within the retort. The flanged nut 25 is threaded in the upper end of the retort 10 and engages about the reduced upper portion of the liner cylinder 22 and upon a shoulder 26 formed by this reduction in the diameter of the liner cylinder. The flange of the nut 25 is provided with suitable wrench engaging faces.

The interior wall of the liner cylinder 22 is of circular, hexagonal, or other cross-section.

Within the liner 22 is a plunger 28 which is adapted to slide up and down vertically therein. When the inner cross-section of the liner cylinder 22 and the outer cross-section of the plunger 28 are complementary, vertically elongated slots 27 are provided in one or the other, but preferably on the inner wall of the liner cylinder, as at 27. When they are not complementary, as for instance when the inner cross-section of the liner cylinder is circular, and the outer cross-section of the plunger is hexagonal, no such slots are necessary (see Fig. 10).

The lower reduced portion of the plunger is provided with an annular recess 29 in which engages an eccentric pin 30 carried by a disk or head 31 upon the inner end of a long rod 32 which extends entirely through the pipe 5 to the exterior of the stove and is bent exteriorly of the pipe into a crank handle 33 to render the turning of the rod convenient. The remoteness of the handle 33 from the burner and its location entirely without the stove enables it to be kept cool at all times.

The rod 32 extends through a T-head 34 which couples with the pipe 6 and also carries a stuffing box 35 to avoid leakage of the oil about the rod 32. The rod 32 furthermore extends through a sleeve 36 carried at the inner end of the pipe 5 and being formed with suitable slots 37 with the spaced apart legs 38 to engage the inner wall of the pipe while at the same time not interfering with the free flow of oil from the tank 7 to the retort 10.

The sleeve 36 may be fitted slidably in the pipe so that it is withdrawn by engagement of the head 31 therewith when the rod 32 is pulled axially. A collar-stop 39 upon the rod 32 engages the other end of the sleeve 36 and keeps the sleeve in place.

In Fig. 7, we have shown a slight modification in which the heating ring 13$^a$ is carried upon pellets 14$^a$ of metal or other suitable material which rest not directly upon the base ring 12$^a$, but upon a relatively small ring 40 which seats in a recess 41 made at the outer edge of the base ring 12$^a$. In accordance with this construction, the rings 13$^a$ and 40 form a unitary construction which may be manufactured separately and independently of the other parts and assembled thereon as by shrinking of the ring 40 in place or simply fitting it to the base ring 12$^a$.

In Fig. 9, the fuel tank 7$^a$ is indicated as situated directly beneath the retort and a vertical pipe 42 is shown as projecting directly upwardly through a stuffing box 43 and having engagement directly with the open base of the retort as at 44, in this case the upper portion of the pipe 42 being widened when necessary, as in the smaller sized vapor-burners, to accommodate the device for reciprocating the plunger 28; the enlarged upper portion of the pipe 42 may be formed with a threaded extension 45 to receive the pipe 46 which in this instance receives no fuel but forms merely a housing for the operating rod 32. The supporting sleeve 36$^a$ may be made solid as there is no requirement for slots therein. A similar result can be attained by dispensing with the T-head 34, and pipe 6, but having pipe 42, without enlarged upper end, fitted into a suitable hole drilled into the central part of the bottom of the retort 10. (See Fig. 2).

In both instances the plunger 28 carries a removable valve pin base 47 having a cleaner pin 48 projecting upwardly therefrom in position to pass through the orifice in the cap 21. The base 47 is preferably screw threaded into the plunger to enable the removal and replacement when the burner wire or cleaner pin becomes worn or broken.

In the embodiment shown in Fig. 2, the spider arms 11 are directly supported upon and in fact are shown in one piece with the retort wall, but in Fig. 9 a separate ring 49 is provided to surround the retort and to carry the inner convergent ends of the arms. This ring is closely fitted about the retort wall and conducts the heat thereto.

In the use of the device, suitable fuel oil or distillate is placed in the tank or reservoir 7 and a pressure created by use of the hand pump 8. A relatively small pressure of a few pounds will suffice to raise the oil through the pipes 6 and 5 to the retort 10. The vapor is started by applying a flame, for instance from an alcohol torch, to the outside of the retort wall in order to initially volatilize the oil, and cause the resulting gases to collect in the liner 22 and issue through the cap 21.

The vapor will take the path indicated in Fig. 2, drawing in air at the sides between the spider arms 11, and the commingled vapor and air will pass up through the opening 20 into the mixing chamber 16 where a thorough intermingling will occur prior to issuance through the perforations 15. The vaporized fuel is ignited as it issues through the perforations 15 and it will entirely envelop the heating ring 13, passing not only at the side and above the ring but also beneath it and to the outside by virtue of the fact that the ring is supported only at intervals by the small pellets 14. The result is that the ring is raised to at least a red heat and it transfers this heat downwardly to the base ring 12 and to the spider arms 11 by which the heat is conducted to the wall of the retort 10. The high conductivity of the metal will cause the heat to be transferred to the liner cylinder 22 and to the fuel inside the retort. The size of the flame can be regulated (1) by varying the pressure in the tank, which causes a proportional varying of pressure at the orifice in the cap 21; or (2) by varying the position of the pin 48, whereby the orifice opening is increased or decreased. In the case of large burners, a hand valve can be inserted in the pipe 6, or pipe 42, to get a further means of regulating the flow of fuel oil, and the resulting flow of vapor.

The plunger 28 will also become heated and this is preferably of a relatively great mass in order that it may take and absorb quantities of heat which in turn it gives off to the fuel. It will thus be appreciated that the fuel passing up through the relatively narrow slots 27 in minute isolated streams will be subjected to a substantially uniform heat on all sides which will not raise its temperature to such an extent as to cause destructive distillation, but at the same time will require the heat to thoroughly permeate the oil mass and to thus thoroughly and uniformly vaporize it. A very complete combustion without appreciable residue is for this reason secured in the burner.

The pin 48 is in the nature of a needle valve and may with advantage be substantially conical. This wire is raised or lowered together with the plunger by action of the crank handle 33. There will be a suitable amount of friction between the various parts to enable the plunger to remain in the adjusted position and should the orifice in the cap 21 tend to become clogged, a few turns of the handle 33 will cause several reciprocations of the pin 48 such as will effect a thorough cleaning of the port.

It will be noted that no leakage can occur at the base of the retort and that a tight joint is provided by the gasket 23 which is compressed by action of the flanged nut 25. Any seepage that occurs will have to be upwardly about the nut 25 and it will necessarily be in the form of vapor which will be sucked up into the burner and will not flow in the form of liquid upon the floor or bottom of the stove and will not burn with a yellow flame such as to produce obnoxious smells and reduce the effective heat but will be volatilized and pass up with the other vaporized fuel to be completely ignited in the burner.

The liner cylinder 22 is susceptible of being inverted as shown in Fig. 6. This is accomplished by removing the flanged nut 25, lifting out the cylinder 22 and replacing it with or without the plunger 28, after it is inverted. The shoulder 26 will fit upon the gasket 23 and the nut 25 may or may not be replaced. The liner cylinder in its inverted position is such as to carry a suitable quantity of alcohol for cleaning purposes and the orifice in the cap 21 will be carried in such a way that the pin 48 may permit of the escape of alcohol in desired quantities into the base of the retort; all this alcohol may be burned therein to consume the carbon and other deposits. Substantially the same cleaning action is had in the device according to Fig. 9.

The parts of the device are few and the construction and arrangement extremely simple but at the same time a high effective heat is secured from very complete combustion in the burner this latter being due to a very thorough vaporization of the fuel oil in the retort. Excellent results are also secured by the fact that the inside portion of the burner may at all times be kept clean and the orifice in the cap may be easily kept free from foreign matter at all times by the simple expedient of turning the handle 33 occasionally. Caps 21 with orifices of various sizes will be provided in suitable numbers so that any desired flow of the fuel may be had and if found necessary pins of a size to correspond may be provided, they being replaced by the removable nature of the base 47.

The vapor-burner has been shown herein as applied to cooking-stoves. The same burner, with slight modifications can be used with heaters, hot-water apparatus, furnaces, boilers and the like.

It is obvious that various changes and modifications may be made in the details of construction and design of the above specifically described embodiment of this invention without departing from the spirit thereof, such changes and modifications being restricted only by the scope of the following claims.

What is claimed is:

1. A vapor burner comprising a retort, supporting arms thereon, a base ring carried by the arms, a heating ring above the base ring, spaced supports for holding the heating ring upon the base ring, and a burner structure adapted to direct a flame against both sides and the top and bottom of the heating ring, substantially as described.

2. A vapor burner comprising a burner structure, a retort, heating means at the burner extending to the retort, means to place the lower part of the retort in communication with a source of liquid fuel supply under pressure, a liner having a closed top and an open bottom mounted in said retort, means to hold the liner in place, a cap in the top of the liner having an orifice, and a plunger mounted to reciprocate in the liner and having a pin fitting slidably in the orifice, substantially as described.

3. A vapor burner comprising a burner structure, a retort, means heated by the burner to convey such heat to the retort, an invertible liner in the retort having an orifice for the escape of vaporized fuel from the retort and slot in its wall, and a movable plunger of relatively great mass in the liner having a pin to project into the orifice, substantially as described.

OSCAR I. STRAUB.
FREDERICK G. WAHL.